United States Patent
Kato et al.

(10) Patent No.: US 6,782,546 B2
(45) Date of Patent: Aug. 24, 2004

(54) RECORDING MEDIUM PLAYBACK APPARATUS (75) Inventors: Takahiro Kato, Kawagoe (JP); Kuniya Satomi, Kawagoe (JP); Kenji Wakatsuki, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 136 days.

(21) Appl. No.: 10/260,299

(22) Filed: Oct. 1, 2002

(65) Prior Publication Data

US 2003/0063549 A1 Apr. 3, 2003

(30) Foreign Application Priority Data

Oct. 2, 2001 (JP) ........................................ 2001-306320

(51) Int. Cl.[7] .............................................. G11B 17/04
(52) U.S. Cl. ..................................... 720/653; 720/673
(58) Field of Search ................................ 720/601, 653, 720/671, 673; 369/75.1, 75.2, 215, 219, 244, 249

(56) References Cited

U.S. PATENT DOCUMENTS

| | | | | |
|---|---|---|---|---|
| 5,862,116 A | * | 1/1999 | Watanabe et al. | 369/75.1 |
| 5,883,870 A | * | 3/1999 | Akiba et al. | 369/77.1 |
| 5,943,309 A | * | 8/1999 | Watanabe | 369/75.1 |
| 6,320,835 B1 | * | 11/2001 | Kamei | 369/75.1 |
| 6,452,887 B2 | * | 9/2002 | Nakayama et al. | 369/75.2 |
| 6,603,723 B2 | * | 8/2003 | Minase | 369/75.2 |

FOREIGN PATENT DOCUMENTS

| | | | |
|---|---|---|---|
| JP | 7-254202 | * | 10/1995 |
| JP | 9-180421 | * | 7/1997 |
| JP | 2000-30334 | * | 1/2000 |
| JP | 2001-118308 | * | 4/2004 |

* cited by examiner

Primary Examiner—David Ometz
(74) Attorney, Agent, or Firm—Sughrue Mion, PLLC (57) ABSTRACT

To mount or dismount a recording medium easily, a recording medium playback apparatus includes a main body 3 and a tray 4. The tray 4 includes a tray body 5, a pickup portion 6 and a lock mechanism. The pickup 6 is mounted on the tray body 5 to be moved freely against the tray body 5. The lock mechanism can move freely between a permissible position and a limited position. The tray 4 can move between a playback position and a mount position. When the tray 4 is in the playback position, the lock mechanism is positioned in the permissible position. When the tray 4 is in the mount position, the lock mechanism is positioned in the limited position.

8 Claims, 7 Drawing Sheets

RECORDING MEDIUM PLAYBACK APPARATUS

BACKGROUND OF THE INVENTION

1. Field of the Invention

This invention relates to a recording medium playback apparatus for reading information on a recording medium such as a compact disc.

2. Description of the Related Art

A CD player, as a recording medium playback apparatus, is mounted in a dashboard of a car as a vehicle. The CD player reads out information recorded on a recording medium such as a compact disc (CD for short).

The CD player is required to be miniaturized for mounting in the dashboard. Therefore, the CD player, which includes a main body being mounted in the dashboard and a tray to be freely received in and projected from the main body, is proposed. The main body is formed into box-shape. The tray includes a tray body for placing a CD on a surface thereof to be freely received in and projected from the main body and a playback mechanism being provided with a turntable being mounted in the tray body and an optical pickup.

The playback mechanism is mounted to move freely against the tray body with a damper of an elastic member such as a rubber and a coil spring on the tray body.

The turntable is provided on the tray body to rotate freely. The turntable is driven rotatively by a driving source such as a motor. The turntable has a clamper for clamping a CD to move into a center hole of the CD. The turntable rotates the CD being clamped by the clamper. The optical pickup can move freely in a direction to be close to or apart from the turntable. The optical pickup can read out data recorded on the CD.

In the structure of the CD player, as mentioned above, a CD is mounted on and dismounted from the tray projecting from the main body. Receiving the tray, in which a CD is mounted on, into the main body, the CD player reads data recorded on the CD with the optical pickup.

The CD player, as mentioned above, has a structure in which a tray body includes a playback mechanism for reading out data recorded on a CD. Therefore, the CD player can be miniaturized and low-profiled. Mounting the playback mechanism to move freely with an elastic member such as a damper or a spring on the tray body, if the car vibrates while running, the playback mechanism can securely read out data recorded on the CD.

Objects to be Solved

In a CD player by prior art, as mentioned above, a playback mechanism is mounted to move freely against a tray body with an elastic member. Therefore, when a CD is mounted on a tray projecting from the playback mechanism, or a CD on the tray is dismounted from the tray, the playback mechanism may move against the tray body. In other words, to mount a CD on or dismount from a damper of the playback mechanism, a force opposing to a clamping force of the clamper is required. Therefore, if the playback mechanism can move, operation of mounting a CD on and dismounting from the tray may not be done satisfactorily.

To overcome the above drawback, an object of this invention is to provide a recording medium playback apparatus in which a CD can be mounted on and dismounted from easily.

SUMMARY OF THE INVENTION

How to Attain the Object

In order to attain the objects, a recording medium playback apparatus according to this invention has a tray to move freely between a playback position in which the tray is received in a main body to read out data recorded on a recording medium and a mount position in which the tray is projected out of the main body to mount or dismount a recording medium on/from the tray, wherein the tray comprises a tray body, a playback mechanism being mounted to move freely against the tray body for mounting a recording medium thereon and reading out data recorded on the recording medium, and a displacement limiter moving freely between a permissible position in which the playback mechanism is permissible to move against the tray body and a limited position in which the playback mechanism is limited to move against the tray body, whereby the displacement limiter is positioned in the permissible position when the tray is set in the playback position and positioned in the limited position when the tray is set in the mount position.

In the recording medium playback apparatus as mentioned above, the displacement limiter moves between the permissible position and the limited position by interlocking to the movement of the tray into and out of the main body.

The recording medium playback apparatus, as mentioned above, further comprises a retainer moving freely between a retaining position in which the tray is retained in the playback position and a release position in which the tray is made to move freely between the playback position and the mount position, wherein the displacement limiter moves from the permissible position to the limited position by interlocking to the movement of the retainer from the retaining position to the release position.

Furthermore, in the recording medium playback apparatus as mentioned above, the displacement limiter moves the tray toward the mount position when the displacement limiter moves from the permissible position to the limited position.

Furthermore, in the recording medium playback apparatus as mentioned above, the displacement limiter includes an arm portion being mounted rotatably on the tray body and an urging device for urging the arm portion in such a direction that one end of the arm portion enters the playback mechanism, whereby the other end of the arm portion pushes the tray by means of urging force of the urging device to move the tray toward the mount position when the arm portion turns from the permissible position to the limited position.

In the recording medium playback apparatus as mentioned above, a supporter is provided to support near-portion of the one end of the arm portion when the arm portion is set in the playback mechanism.

Furthermore, in the recording medium playback apparatus as mentioned above, the one end of the arm portion is tapered gradually in proportion to a distance to the playback mechanism.

Furthermore, in the recording medium playback apparatus as mentioned above, the playback mechanism has an opening for the one end of the arm portion going therethrough, whereby the opening is formed to have gradually widening in width, in a direction perpendicular to a direction of the arm portion entering the opening, toward an opposite direction of the one end of the arm portion entering the opening.

In the recording medium playback apparatus according to this invention, when the tray is positioned in the mount position, the displacement limiter is positioned in the limited position. Therefore, when the tray is positioned in the mount position, the playback mechanism can not move easily against the tray body.

When the tray is positioned in the playback position, the displacement limiter is positioned in the permissible position. Thereby, when the tray is in the playback position, the playback mechanism can move freely against the tray body. Therefore, even if vibration acts on the recording medium playback apparatus, the playback mechanism can securely read out data recorded on a recording medium.

In the recording medium playback apparatus according to this invention, the displacement limiter moves by interlocking to the movement of the tray so that, when the tray is positioned in the mount position, the displacement limiter is securely positioned in the limited position. Therefore, when the tray is in the mount position, the playback mechanism can not move easily against the tray body.

When the tray is positioned in the playback position, the displacement limiter is positioned in the permissible position. Thereby, when the tray is in the playback position, the playback mechanism becomes securely to be enabled to move freely against the tray body. Therefore, even if vibration acts on the recording medium playback apparatus, the playback mechanism can securely read out data recorded on a recording medium.

In the recording medium playback apparatus according to this invention, the displacement limiter moves from the permissible position to the limited position by interlocking to the movement of the retainer from the retaining position to the release position. Thereby, the playback mechanism becomes to be disabled to move easily against the tray body in proportion to projecting the tray out of the main body. Therefore, when the tray is positioned in the mount position, the playback mechanism can not move more securely against the tray body.

In the recording medium playback apparatus according to this invention, the displacement limiter moves the tray toward the mount position when the displacement limiter moves from the permissible position to the limited position. Thereby, the playback mechanism becomes securely to be disabled to move easily against the tray body in proportion to projecting the tray out of the main body. Therefore, when the tray is positioned in the mount position, the playback mechanism can not move more securely against the tray body.

In the recording medium playback apparatus according to this invention, the displacement limiter includes an arm portion and an urging device for urging the arm portion. The urging device urges the arm portion in a direction of one end of the arm portion entering the playback mechanism. The urging device moves the tray toward the mount position when the arm portion turns from the permissible position to the limited position.

Thereby, the tray is moved securely from the playback position to the mount position by means of urging force of the urging device. In the limited position, the one end of the arm portion is set in the playback mechanism so that the playback mechanism can not move easily against the tray body.

In the permissible position, the one end of the arm portion is out of the playback mechanism. Thereby, the playback mechanism can securely move freely against the tray body in the permissible position. Therefore, the playback mechanism can securely read out data recorded on a recording medium.

In the recording medium playback apparatus according to this invention, the supporter supports near-portion of the one end of the arm portion when the arm portion is set in the playback mechanism. Thereby, in the limited position, the one end of the arm portion is prevented from going out of the playback mechanism. Preferably, the supporter supports the one of the arm portion.

In the recording medium playback apparatus according to this invention, the one end of the arm portion is tapered gradually in proportion to a distance to the playback mechanism. Thereby, the one end of the arm portion can securely go into the playback mechanism.

In the recording medium playback apparatus according to this invention, the width of the opening is gradually widened toward an opposite direction of the one end of the arm portion entering the opening. Thereby, the one end of the arm portion can securely go into the opening.

The above and other objects and features of this invention will become more apparent from the following description taken in conjunction with the accompanying drawings.

DESCRIPTION OF THE PREFERRED EMBODIMENT

A recording medium playback apparatus 1 of an embodiment according to this invention will now be described with reference to FIGS. 1–10. The recording medium playback apparatus 1 shown in FIG. 1 may be mounted in a dashboard of a car as a vehicle. The recording medium playback apparatus 1 receives a CD 2 (shown in FIG. 1) as a recording medium and reads out (playbacks) data recorded on the CD 2 to output the data as sounds.

Figures 1, 8, 9:
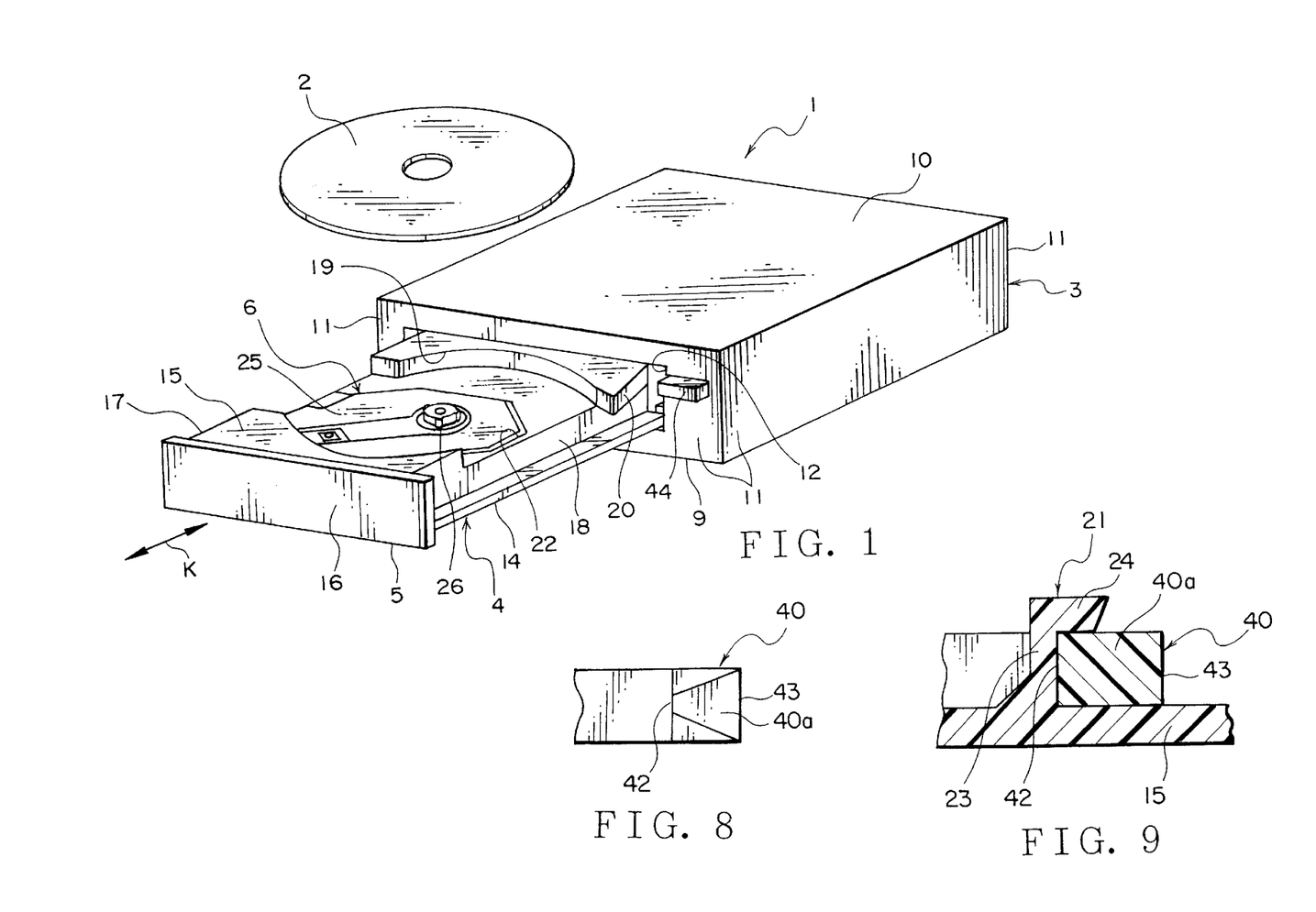
FIG. 1 is a perspective view of a recording medium playback apparatus according to an embodiment of the invention.
FIG. 8 is a drawing of one end of an arm, viewing from an arrow VIII in FIG. 3.
FIG. 9 is a sectional view taken along the line IX—IX in FIG. 7.
Figure 2:
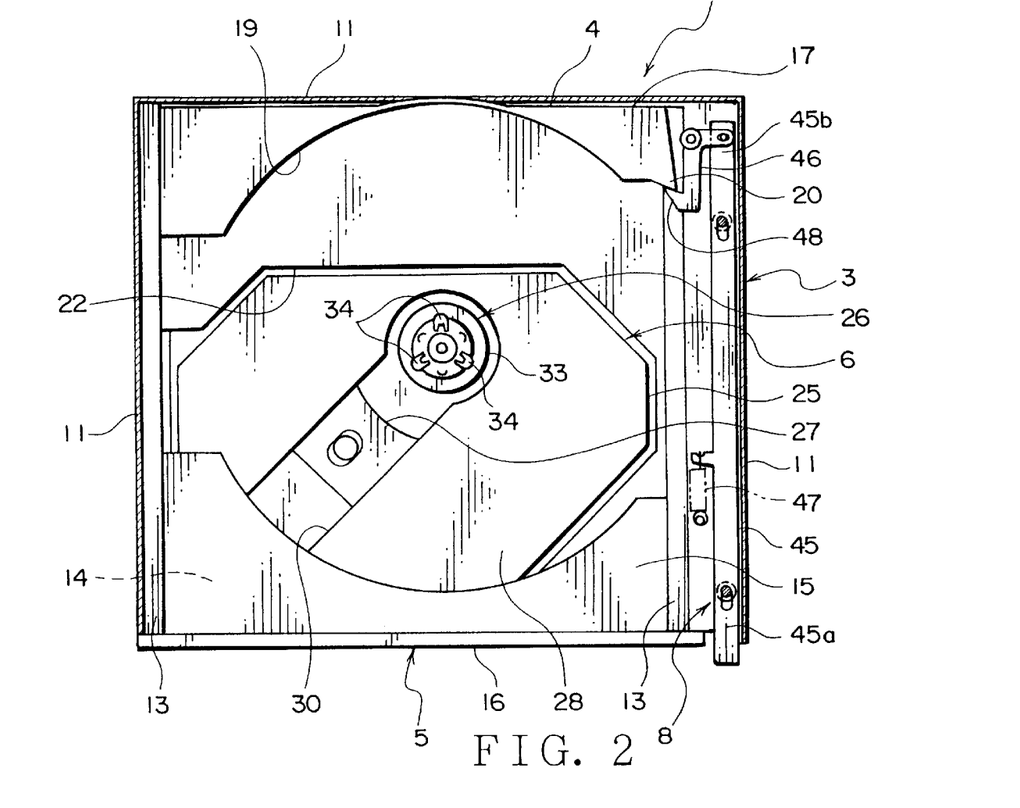
FIG. 2 is an explanation drawing of a top view of the recording medium playback apparatus, shown in FIG. 1, in which a tray is positioned in a playback position.

The recording medium playback apparatus 1, as shown in FIG. 1, includes a main body 3, a tray 4 and a second lock mechanism 8 (shown in FIGS. 2–7) as a retainer. The main body 3 is mounted in the dashboard. The main body 3 has a flat bottom wall 9, a flat top wall 10 opposite to the bottom wall 9 with a distance, and a plurality of side walls 11 continuous with the both of the bottom wall 9 and the top wall 10 to be formed into flat-box shape.

One side wall 11, located near side in FIG. 1, of the plurality of side walls 11 is formed with a tray opening 12.

The tray opening 12 goes through the one side wall 11. The tray opening 12 can pass the tray 4 therethrough. The tray 4 moves along arrow K in FIG. 1 through the tray opening 12 to be received in the main body 3 or ejected from the main body 3 (projected out of main body 3).

A pair of guide rails 13 is mounted on inside of the main body 3 as shown in FIGS. 2–7. The pair of guide rails 13 is provided widthwise on the both sides of the main body 3. In other words, the pair of guide rails 13 is mounted on the both sides of the tray opening 12. The guide rails 13 extend respectively along one way. The guide rails 13 extend lengthwise toward far side of depth of the main body 3, viewing from the tray opening 12. In short, the lengthwise guide rails 13 run along the arrow K.

Figure 3:
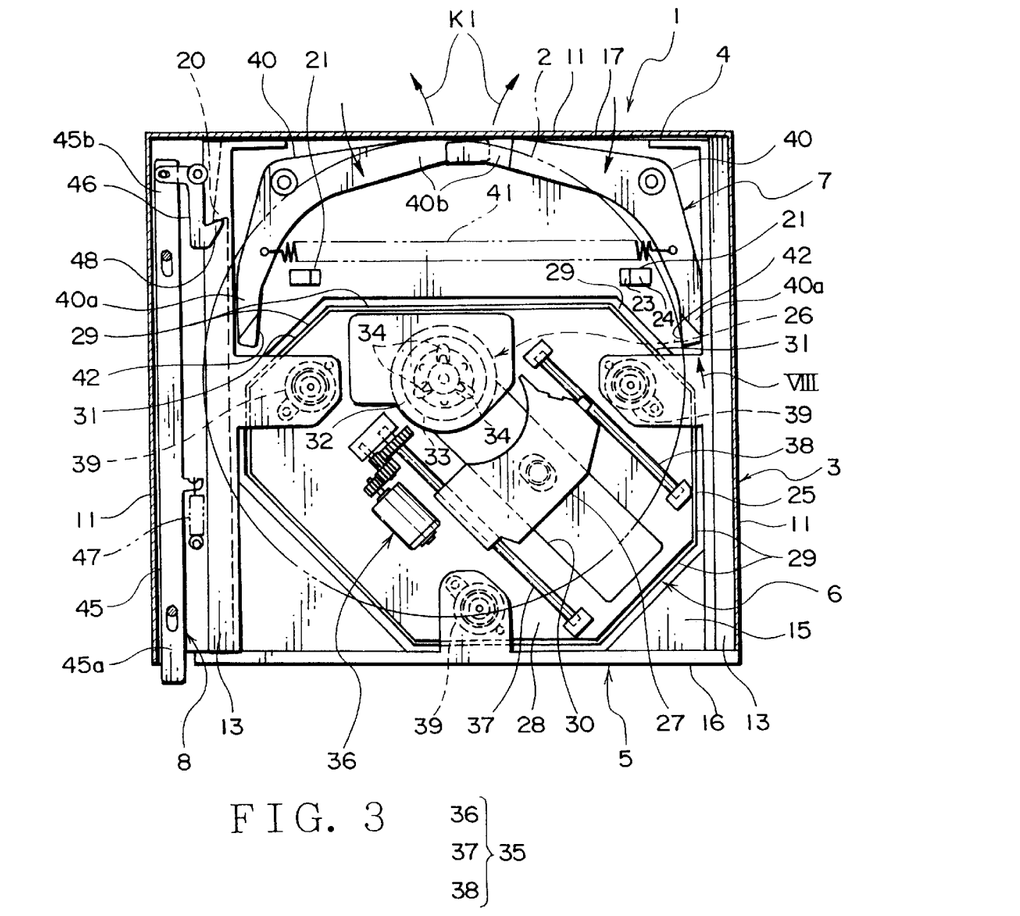
FIG. 3 is an explanation drawing of a bottom view of the recording medium playback apparatus shown in FIG. 2.
Figure 5:
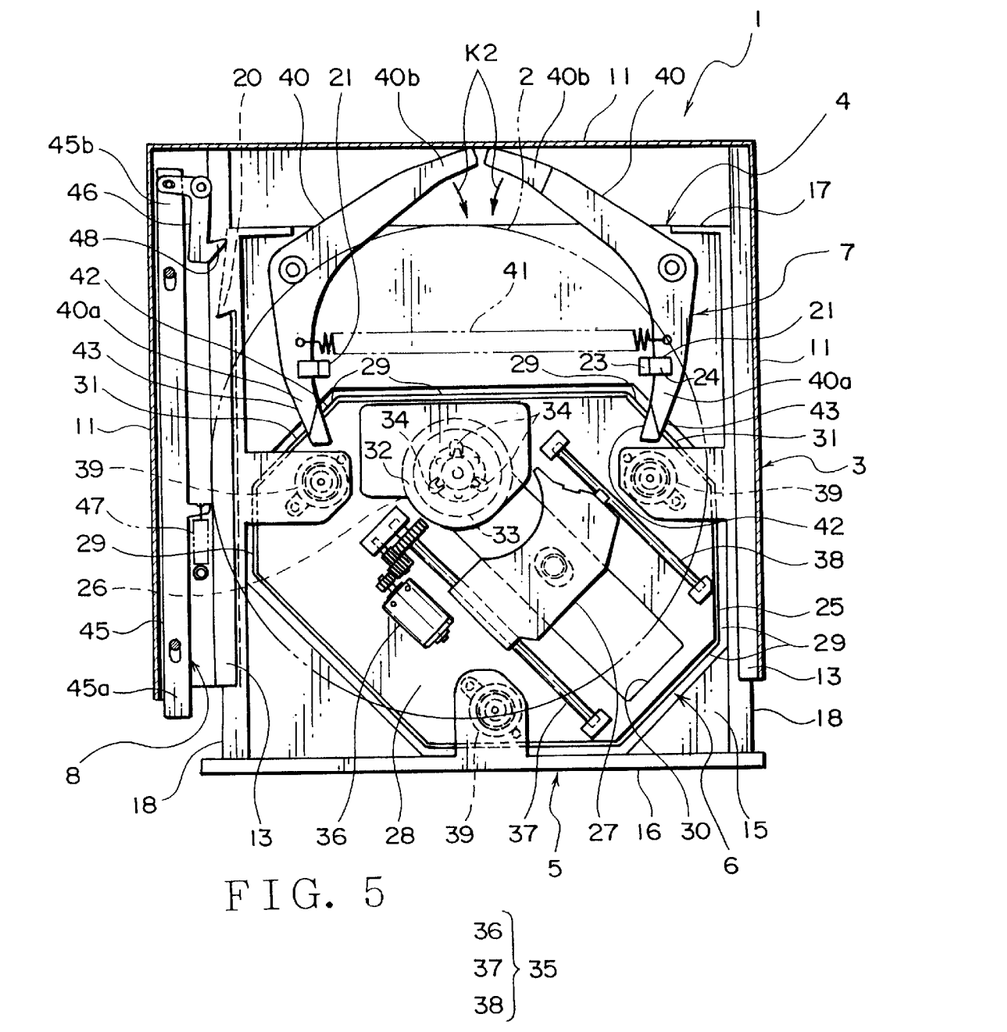
FIG. 5 is an explanation drawing of a bottom view of the recording medium playback apparatus shown in FIG. 4.
Figure 7:
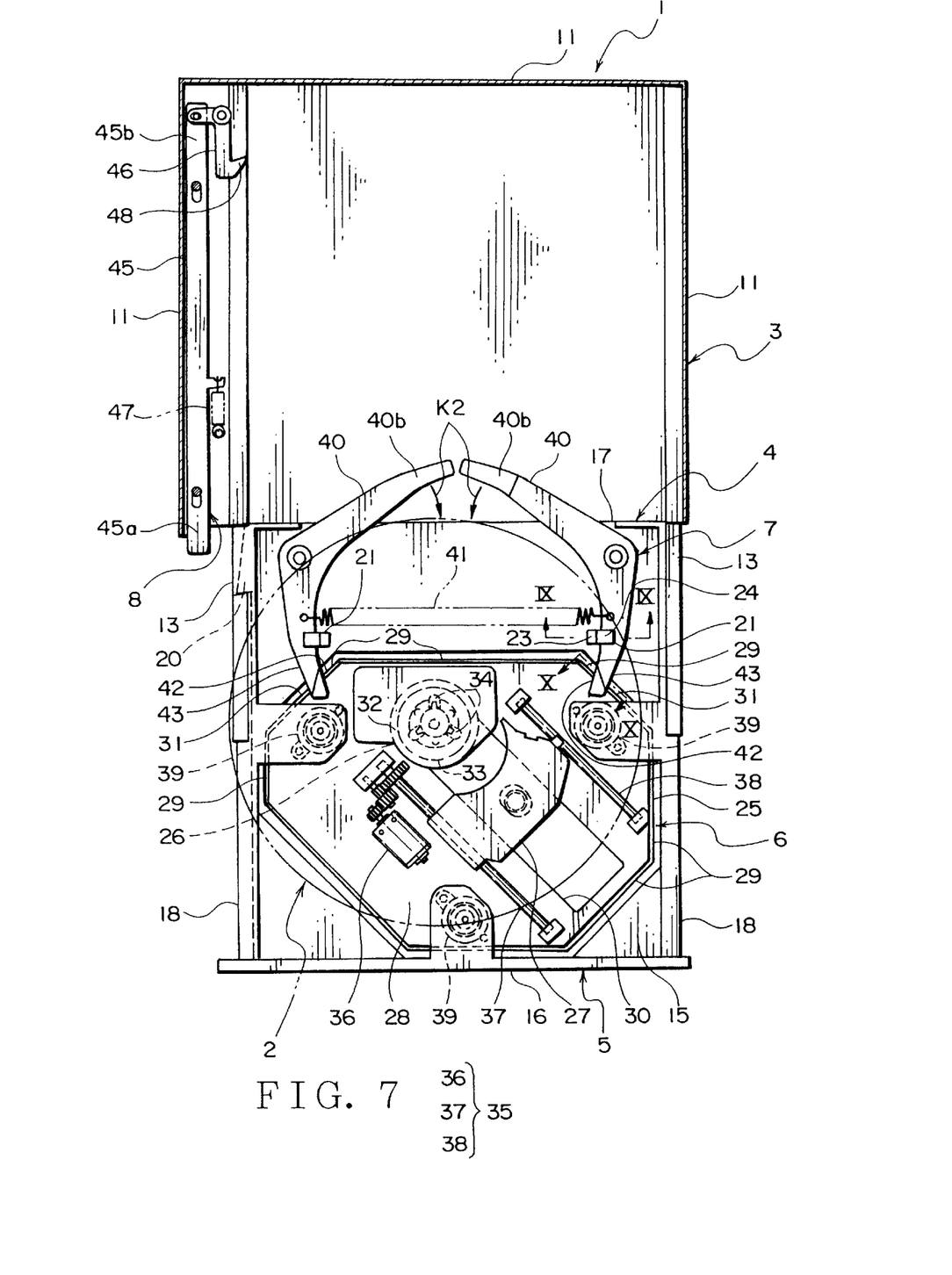
FIG. 7 is an explanation drawing of a bottom view of the recording medium playback apparatus shown in FIG. 6.

The tray 4, as shown in FIGS. 3, 5 and 7, includes a tray body 5 with rectangular shape in top view, a playback mechanism 6 and a lock mechanism 7 as a displacement limiter. The tray body 5 has a bottom wall 14, a top wall 15 opposite to the bottom wall 14 with a distance, a near-side wall 16, a far-side wall 17 and a pair of side walls 18 to be formed into a flat-box shape.

The bottom wall 14 is parallel to the bottom wall 9. The top wall 15 is parallel to the top wall 10. The near-side wall 16 joins the bottom wall 14 and the top wall 15 mutually. The near-side wall 16 is parallel to the one side wall 11 having the tray opening 12. The near-side wall 16 is positioned on the same plane of the one side wall 11 having the tray opening 12 in a later-described playback position.

The far-side wall 17 joins the bottom wall 14 and the top wall 15 mutually and is parallel to a side wall 11 located in far side in FIG. 1. The far-side wall 17 is located farthest in the near-side wall 16, the far-side wall 17 and the pair of side walls 18 from the tray opening 12. The pair of side walls 18 is opposite to each other with a distance and parallel to each other. The side walls 18 join the bottom wall 14 and the top wall 15 and is parallel to the side walls 11 located widthwise at the both side in the main body 3.

The tray body 5 is provided with a depression 19, a locking portion 20 and a pair of stoppers 21. The depression 19 is formed concavely from the top wall 15 located at upper side in FIG. 1. The depression 19 is formed into circular along an outline of the CD 2 in plane view. The CD 2 is positioned in the depression 19. The CD 2 is positioned on the tray body 5, i.e. on a surface of the tray 4. The depression 19 has a mounting opening 22 for playback mechanism. The mounting opening 22 for playback mechanism runs through a bottom surface of the depression 19.

The locking portion 20 projects from one of the pair of side walls 18 toward outside of the tray body 5. In other words, the locking portion 20 projects outwardly from one widthwise end of the tray body 5. The locking portion 20 is located at a far end from the tray opening 12 of the tray body 5, in a direction of depth of the tray body 5 in FIG. 1 (along an arrow K in FIG. 1), when the tray body, i.e. the tray 4, is received in the main body 3. The locking portion 20 can be locked with a later-described locking arm 46 of the second locking mechanism 8.

The stopper 21 is located in the vicinity of a later-described arm 40 in the lock mechanism 7. The stopper 21 stands from an inner surface of the top wall 15 of the tray body 5 toward the bottom wall 14. The stopper 21, as shown in FIG. 9, is formed integrally with a stand piece 23 standing from the top wall 15 and a parallel piece 24 continuous to a far end from the top wall 15 of the stand piece 23.

The parallel piece 24 extends outwardly from the end of the stand piece 23 along width of the tray body 5. When a later-described arm 40 is positioned in the limited position, the pair of stoppers 21 makes the stand piece 23 contact with one end 40a of the arm 40 and clamps the one end 40a of the arm 40 between the top wall 15 and the parallel piece 24.

The stoppers 21 clamps the one end 40a of the arm 40 moving to the limited position between the top wall 15 and the parallel piece 24 to prevent the arm 40 from moving. The stoppers 21 hold the one end 40a and near-portion of the one end 40a of the arm 40 positioned in the limited position. The stoppers 21 perform as a supporter described in this specification.

The tray body 5 is supported at the both widthwise ends thereof by the pair of guide rails 13 to move freely along lengthwise the guide rails 13. The tray body 5 passes through inside of the tray opening 12 to move along the guide rails 13. The tray body 5, i.e. tray 4, moves between a position to be received in the main body 3 (call a playback position hereafter) and a position to be projected out of the main body 3 (call a mount position hereafter).

In the playback position, the recording medium playback apparatus 1 can read out data recorded on the CD 2. In the mount position, the CD 2 placed on the depression 19 can be removed or the CD 2 can be placed on the depression 19. Thus, the CD 2 is removable against the tray body 5, i.e. tray 4, in the mount position.

The playback mechanism 6, as shown in FIGS. 2–7, includes a playback mechanism body 25, a turntable 26 and an optical pickup. The playback mechanism body 25 is formed with bending a sheet metal. The playback mechanism body 25 has a flat top wall 28 and a plurality of side walls 29 continuous to outer edges of the top wall 28. The top wall 28 has a plane shape following a plane shape of the mounting opening 22. The top wall 28 has a pickup opening 30. The pickup opening 30 run through the top wall 28.

The plurality of side walls 29 stand respectively from the top wall 28. Two side walls 29 of the plurality of side walls 29 have a opening 31. The opening 31 run through the side wall 29. The opening 31 has a rectangular shape in plane view. When the playback mechanism 6 is installed in the tray body 5, lengthwise of the opening 31 is along widthwise of the tray body 5, i.e. the tray 4. The one end 40a of the arm 40 goes into the opening 31.

The turntable 26 has a base portion 32 being mounted on the top wall 28 and a table 33 projecting to inside of the depression 19 through the pickup opening 30. The turntable 26 is located at the center of the depression 19 being formed into circular shape along the outline of the CD 2. The base portion 32 includes a not-shown motor for rotating the table 33.

The turntable 33 is formed into circular shape in plane view. The turntable 33 is supported rotatably by the base portion. The turntable 33 has a plurality of in-and-out members 34 to move in and out freely from a surface of the table 33. The in-and-out members 33 are located at even intervals along circle of the table 33. In an example shown in a figure, three in-and-out members 34 are provided.

The in-and-out member 34 is urged to move out from the surface of the table 33 by a not-shown coil spring. The table 33 goes into the center hole of the CD 2. After the in-and-out members 34 once move into the surface of the table 33, the in-and-out members 34 move out again from the surface of the table 33 to engage with an inner edge of the CD 2. After the in-and-out members 34 of the table 33 engage with the inner edge of the CD 2, the turntable 26 rotates the CD 2 by means of a driving force such as a motor in the base portion 32.

The optical pickup 27 reads out data recorded on the CD 2. The optical pickup 27 is moved close to or apart from the turntable 26 by means of a drive mechanism 35. The drive mechanism 35, as shown in FIGS. 3, 5 and 7, has a motor 36, a feed screw shaft 37 and a supporting shaft 38. The motor 36 is mounted on the top wall 28. The feed screw shaft 37 is supported rotatably by the top wall 28. The feed screw shaft 37 is rotated around the center axis by means of rotatory driving force of the motor 36. Lengthwise of the feed screw shaft 37 extends along a diameter of the CD 2 placed in the depression 19. The supporting shaft 38 is mounted in parallel with the feed screw shaft 37 on the top wall 28.

The optical pickup 27 is supported by means of the feed screw shaft 37 and the supporting shaft 38 to be exposed through the pickup opening 30. The optical pickup 27 is engaged at one end thereof with the feed screw shaft 37 and supported at the other end thereof by means of the supporting shaft 38 to move freely. The optical pickup 27 can move freely along lengthwise of the supporting shaft 38.

Thereby, the optical pickup 27 is moved along the diameter of the CD 2 placed in the depression 19 by means of driving force of the motor 36 in the drive mechanism 35. The optical pickup 27 moves along the diameter of the CD 2 placed in the depression 19 to go close to or apart from the turntable 26.

The playback mechanism 6 is mounted through a damper 39 made of an elastic material such as a rubber (shown in FIGS. 3, 5 and 7) and a not-shown coil spring in the tray body 5 to move freely against the tray body 5. The damper 39 and the coil spring are defined as elastic members. The top wall 28 of the playback mechanism body 25 is exposed through the mounting opening 22 into the depression 19 and placed on the same plane as a bottom surface of the depression 19.

The in-and-out member 34 engages with the inner edge of the center hole of the CD 2 so that the turntable 26 clamps the CD 2. Thereafter, the playback mechanism 6 makes the turntable 26 rotate the CD 2 and makes the optical pickup 27 read out data recorded on the CD 2.

If the main body 3 is vibrated by means of vibration of the car during running, the playback mechanism 6 moves against the tray body 5, i.e. the main body 3, by means of the damper 39 and the coil spring. Thus, the damper 39 and coil spring prevent that reading out data on the CD 2 is adversely affected by vibration of the car during running.

The lock mechanism 7, as shown in FIGS. 3, 5 and 7, has a pair of arms 40 and a coil spring 41 for urging. The arms 40 are formed into L-shape in plane view. The arms 40 are located at deeper side than the playback mechanism 6 in the recording medium playback apparatus 1. The arms 40 are supported, at the lengthwise center portion thereof, rotatably by the top wall 15 of the tray body 5. The arms 40 can move freely along an arrow K1 (shown in FIG. 3) and along an arrow K2 (shown in FIGS. 4–7) between a position in which the one end 40a goes through the opening 31 into the playback mechanism 6 (call a limited position hereafter) and a position in which the one end 40a goes out of the playback mechanism 6 (call a permissible position hereafter).

In the limited position, the one end 40a goes into the playback mechanism 6 to limit the playback mechanism 6 to move against the tray body. Thus, in the limited position, the playback mechanism 6 can not move easily against the tray body 5 or can not move against the tray body 5. In the limited position, the other end 40b of the arm 40 projects outwardly from an outer surface of the far-side wall 17 of the tray body 5.

In the permissible position, the one end 40a goes out of the playback mechanism 6 to permit the playback mechanism 6 to move against the tray body. Thus, in the permissible position, the playback mechanism 6 can move freely against the tray body 5. In the permissible position, the other end 40b of the arm 40 is received in the tray body 5.

Figure 10:
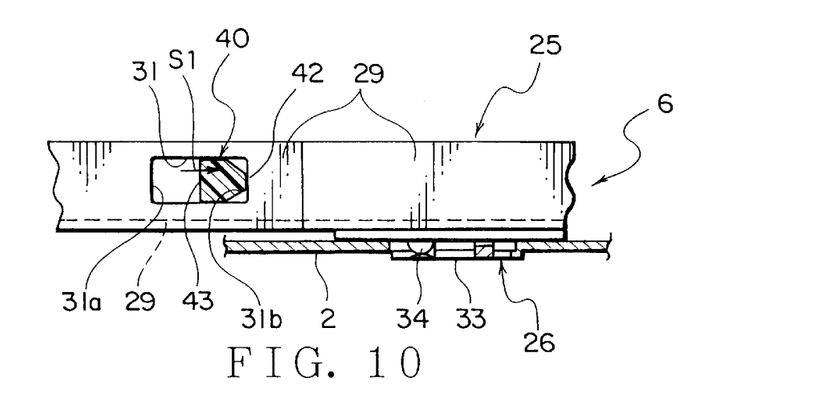
FIG. 10 is a sectional view taken along the line X—X in FIG. 7.

To go into the opening 31, the one end 40a of the arm 40 goes along an arrow S1 in FIG. 10 into lengthwise one end 31a of the opening 31 (shown in FIG. 10), and thereafter the one end 40a goes into the other end 31b of the opening 31 (shown in FIG. 10). The one end 31a of the opening 31 is located toward widthwise outside of the tray body 5 and the other end 31b of the opening 31 is located toward widthwise center of the tray body 5. The arrow S1 indicates a direction in which the one end 40a of the arm 40 goes into the opening 31.

To go into the opening 31, the one end 40a of the arm 40 goes from one edge 42 located toward inside of the tray body 5 into the opening 31. The one end 40a of the arm 40, as shown in FIG. 8, is tapered gradually from the other edge 43 located toward outside of the tray body 5 to the one edge 42. Thus, the one end 40a is tapered gradually in proportion to a distance to the playback mechanism 6 in the permissible position. The arm 40 corresponds to the arm position described in this specification.

The coil spring 41 is hooked between the one ends 40a of the pair of arms 40. The coil spring 41 urges the pair of arms 40 to close the one ends 40a mutually. Thus, the coil spring 41 urges the arms 40 toward the limited position. In other words, the coil spring 41 urges the arms 40 to move the one ends 40a toward the center of the playback mechanism 6. In an example shown in a figure, one coil spring 41 is provided. In this invention, a pair of coil springs 41 may be provided. Preferably, in this case, the coil springs 41 urge the pair of arms 40 also to close the one ends 40a mutually.

The second lock mechanism 8 is mounted at widthwise one end of the tray body 5. The second lock mechanism 8 includes a switch button 44 (shown in FIG. 1), a lever 45 (shown in FIGS. 2–7), a lock arm 46 (shown in FIGS. 2–7) and a coil spring 47 (shown in FIGS. 2–7). The switch button 44 is mounted on the one side wall 11 having the tray opening 12 in the main body 3. The switch button 44 is supported by means of the one side wall 11 to move freely along an arrow K.

The lever 45 is formed into band shape. The lever 45 is supported by means of the main body 3 to move freely along the arrow K. One end 45a of the lever 45 contacts to the switch button 44. The lever 45 can move freely along the arrow K together with the switch button 44.

The lock arm 46 is mounted rotatably around a vertical axis on the main body 3. One end of the lock arm 46 is engaged with the other end 45b of the lever 45. The lock arm 46 turns by interlocking to the movement of the lever 45 along the arrow K. The lock arm 46 is provided at the other end thereof with a locking hook 48. The locking hook 48 can be locked with the locking portion 20 of the tray body 5.

The lock arm 46 can move (turn) freely between a position in which the locking hook 48 locks the locking portion 20 of the tray body 5 to near the tray 4 (call a retaining position hereafter) and a position in which the locking hook 48 unlocks the locking portion 20 of the tray body 5 to apart from the tray 4 (call a release position hereafter). The coil spring 47 urges the lever 45 to close the one end 45a to the one side wall 11, i.e. the switch button 44.

In the second lock mechanism 8 having a structure as mentioned above, the lock arm 46 is maintained in the retaining position by means of urging force by the coil spring 47. When the locking hook 48 locks the locking portion 20 of the tray body 5 in this condition, the tray 4 is retained in the playback position. When the switch button 44 is pushed toward the one side wall 11 against the urging force by the coil spring 47, the lever 45 is moved toward far side of the tray body 5 and the lock arm 46 is moved to the release position. Thereby, the locking hook 48 unlocks the locking portion 20 so that the tray 4 can move freely between the playback position and the mount position.

Figure 4:
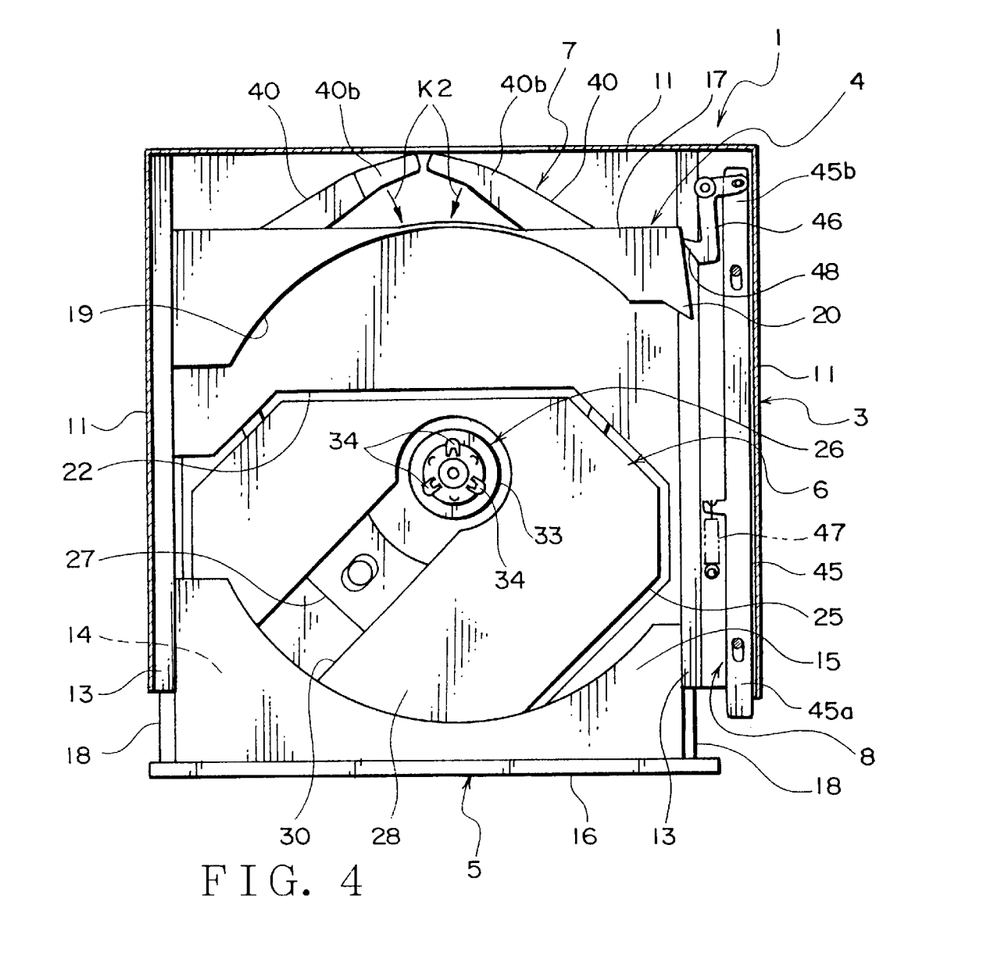
FIG. 4 is an explanation drawing of a top view of the recording medium playback apparatus, shown in FIG. 2, in which a tray is partly projected out of a main body.

In the recording medium playback apparatus having a structure as mentioned above, the tray 4 moves from the playback position shown in FIGS. 3, 4 to the mount position shown in FIGS. 6, 7, as follows. At the playback position shown in FIGS. 2, 3, the lock arm 46 is retained in the retaining position by means of urging force of the coil spring 47. The locking hook 48 of the lock arm 47 locks the locking portion 20 of the tray body 5.

The other end 40b contacts to an inner surface of the main body 3 and the one end 40a is out of the opening 31, i.e. the playback mechanism 6, so that the arm 40 is positioned in the permissible position. The playback mechanism 6 can move freely against the tray body 5 by means of the damper 39 and the coil spring.

When the switch button 44 is pushed toward far side of the main body 3 against the urging force of the coil spring 47, the lock arm 46 moves to the release position. The locking hook 48 unlocks the locking portion 20. The arm 40 moves along the arrow K in FIG. 3 by means of the urging force of the coil spring 41. The other end 40b of the arm 40 pushes an inner surface of the side wall 11 facing to the one side wall 11 having the tray opening 12 and the one ends 40a close to each other.

The other end 40b of the arm 40 projects from the far-side wall 17 of the tray body 5 to out side of the tray body 5. The one end 40a of the arm 40 goes once into the one end 31a of the opening 31 and thereafter goes into the other end 31b of the opening 31. Thereby, a part of the tray 4 projects out of the main body 3 and the arm 40 is positioned in the limited position.

While the arm 40 turns from the permissible position to the limited position, the other end 40b pushes the tray 4 by means of the urging force of the coil spring 41 to move the tray 4 toward the mount position. Thus, while moving from the permissible position to the limited position, the lock mechanism 7 moves the tray 4 toward the mount position. The playback mechanism 6 can not move easily (or can not move) against the tray body 5. Simultaneously, the one end 40a of the arm 40 is supported by means of the stopper 21.

Thereafter, the tray 4 is pulled out of the main body 3 through the tray opening 12. The tray 4, as shown in FIGS. 6 and 7, is moved in the mount position. In the mount position, the CD 2 is removed from the turntable 26 or placed in the depression 19 to be clamped on the turntable 26.

Figure 6:
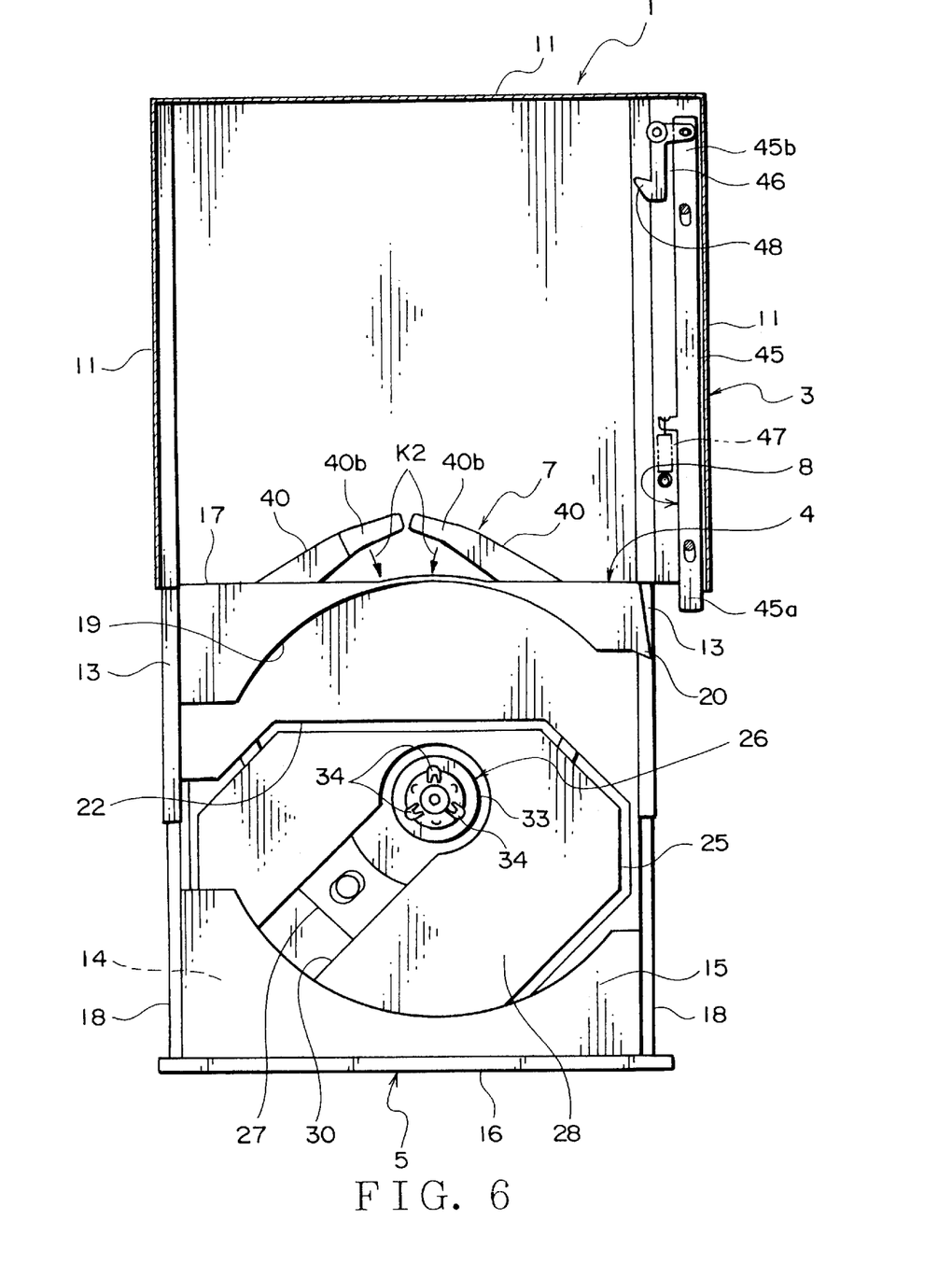
FIG. 6 is an explanation drawing of a top view of the recording medium playback apparatus, shown in FIG. 1, in which a tray is positioned in a mount position.

To move the tray 4 positioned in the mount position to the playback position, the tray is pushed from the mount position shown in FIGS. 6 and 7 toward far-side of the main body 3 through the tray opening 12. Thereby, the other end 40b of the arm 40 contacts to an inner surface of the side wall 11 opposite to the one side wall 11 having the tray opening 12 in the main body 3. Furthermore, pushing more the tray 4 toward far-side of the main body 3, the arm 40 is moved along the arrow K2 in FIGS. 4 and 5 against the urging force of the coil spring 41.

The other end 40b is pushed by means of the inner surface of the main body 3, and then the one end 40a goes out of the opening 31. The arm 40 is positioned in the permissible position. The lock arm 46 is moved once in the release position against the urging force of the coil spring 47 and thereafter moved again in the retaining position so that the locking hook 48 locks the locking portion 20. Thus, the tray 4 is positioned in the playback position and the arm 40 of the lock mechanism 7 is moved in the permissible position. Thereby, the playback mechanism 6 can move freely against the tray body 5.

In the recording medium playback apparatus 1 having a structure as mentioned above, when the tray 4 is positioned in the playback position, the arm 40 of the lock mechanism 7 is positioned in the permissible position and the playback mechanism 6 can move freely against the tray body 5. Conversely, when the tray 4 is positioned in the mount position, the arm 40 of the lock mechanism 7 is positioned in the limited position and the playback mechanism 6 is limited to move against the tray body 5.

Furthermore, the arm 40 of the lock mechanism 7 moves from the permissible position to the limited position by interlocking to the movement of the tray 4 from the playback position to the mount position. Conversely, the arm 40 of the lock mechanism 7 moves from the limited position to the permissible position by interlocking to the movement of the tray 4 from the mount position to the playback position. The tray 4 moves from the playback position to the mount position by interlocking to the movement of the lock arm 46 of the second lock mechanism 8 from the retaining position to the release position.

According to this embodiment, when the tray 4 is positioned in the mount position, the arm 40 of the lock mechanism 7 is positioned in the limited position. Thereby, when the tray 4 is in the mount position, the playback mechanism 6 can not move easily against the tray body 5. Therefore, when a CD 2 is mounted on or dismounted from the playback mechanism 6 of the tray 4, the playback mechanism 6 can not move easily. Then, a CD 2 can be easily mounted on or dismounted from the playback mechanism 6 of the tray 4.

When the tray 4 is positioned in the playback position, the arm 40 of the lock mechanism 7 is positioned in the permissible position. Thereby, positioning the tray 4 in the playback position, the playback mechanism 6 can move freely against the tray body 5. Therefore, even if vibration acts on the recording medium playback apparatus, the playback mechanism 6 can securely read out data recorded on a CD 2.

The arm 40 of the lock mechanism 7 moves from the permissible position to the limited position by interlocking to the movement of the lock arm 46 of the second lock mechanism 8 from the retaining position to the release position. Thereby, the playback mechanism 6 becomes to be disabled from moving against the tray body 5 in proportion to the tray 4 projecting out of the main body 3. Then, positioning the tray 4 in the mount position, the playback mechanism 6 can not move securely against the tray body 5. Therefore, a CD 2 can be easily mounted on or dismounted from the playback mechanism 6 of the tray 4.

The lock mechanism 7 includes the arm 40 and the coil spring 41 for urging the arm 40. The coil spring 41 urges the arm 40 to move the one end 40a into the playback mechanism 6. When the tray 4 is positioned in the playback position, the other end 40b of the arm 40 abuts on the main body 3. When the lock arm 46 of the second lock mechanism 7 moves from the retaining position to the release position, the coil spring 41 makes the other end 40b push the main body 3 to make the tray 4 project out of the main body 3.

Thereby, the tray 4 can be moved securely from the playback position to the mount position by means of the urging force of the coil spring 41. In the limited position, the one end 40a of the arm 40 goes into the playback mechanism 6 and then the playback mechanism 6 becomes securely to be disabled to move easily against the tray body 5. Thus, when a CD 2 is mounted on or dismounted from the playback mechanism 6 of the tray 4, the playback mechanism 6 can not move easily. Therefore, a CD 2 can be more easily mounted on or dismounted from the playback mechanism 6 of the tray 4.

In the permissible position, the one end 40a of the arm 40 is out of the playback mechanism 6. Thereby, in the permissible position, the playback mechanism 6 becomes securely to be enabled to move freely against the tray body 5. Therefore, the playback mechanism 6 can securely read out data recorded on a CD 2.

The stoppers 21 support the one ends 40a and the vicinities of the one ends 40a of the arms 40 in the limited position. Thereby, in the limited position, the one ends 40a of the arms 40 can not move so that the one ends 40a of the arms 40 is provided from going out of the playback mechanism 6. Then, when a CD is mounted on or dismounted from the playback mechanism 6, the playback mechanism 6 can not move easily. Therefore, a CD 2 can be easily mounted on or dismounted from the playback mechanism 6 of the tray 4.

The one end 40a of the arm 40 is tapered gradually in proportion to a distance to the playback mechanism 6. Thereby, the one end 40a of the arm 40 can go securely into the playback mechanism 6. Therefore, when a CD 2 is mounted on or dismounted from the playback mechanism 6 of the tray 4, the playback mechanism 6 can not move easily. Then, a CD 2 can be easily mounted on or dismounted from the playback mechanism 6 of the tray 4.

Figure 11:
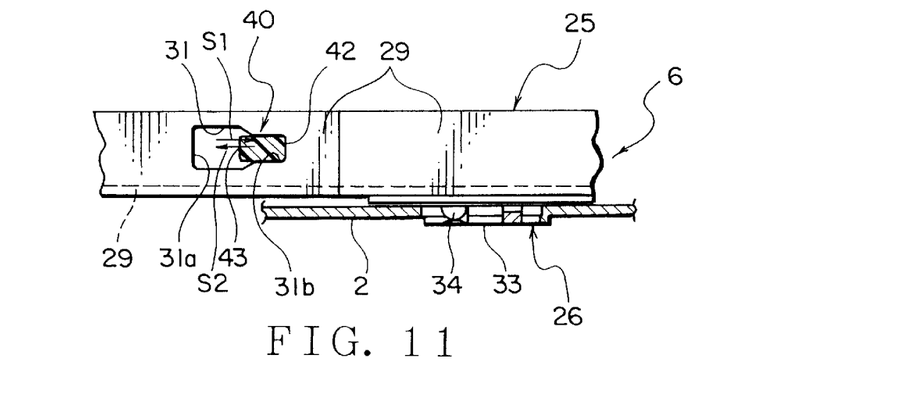
FIG. 11 is a sectional view of a modified embodiment of an opening shown in FIG. 10.

In the embodiment described above, the opening 31 is formed into rectangular shape in plane view. In this invention, the opening 31 may be formed with a width, in a direction perpendicular to a direction of moving the one end 40a of the arm 40, to be narrowed gradually from the end 31a to the other end 31b as shown in FIG. 11. In FIG. 11, the width of the opening 31 is narrowed stepwise. In this invention, the width of the opening 31 may be narrowed continuously.

In this case, the width of the opening 31 is widened gradually from the other end 31b to the end 31a. In other words, the width, in a direction perpendicular to a direction in which the one end 40a goes into the opening 31 (the arrow S1), of the opening 31 is widened gradually along the arrow S2, opposite to the arrow S1. Thereby, the one end 40a of the arm 40 can securely go into the opening 31. Therefore, when a CD 2 is mounted on or dismounted from the playback mechanism 6 of the tray 4, the playback mechanism 6 can not move (can not move easily). Then, a CD 2 can be easily mounted on or dismounted from the playback mechanism 6 of the tray 4.

In the embodiment described above, the tray 4 is projected out of the main body 3 and the arm 40 of the lock mechanism 7 is moved from the permissible position to the limited position by means of the urging force of the coil spring 41. In this invention, the tray 4 can also be moved by means of drive force by a motor between the playback position and the mount position. A position of the arm 40 may be sensed by means of a position sensing pickup for sensing a relative position of the tray 4 against the main body 3 to control turning the arm 40 by means of drive force of a motor.

Although the present invention has been fully described by way of examples with reference to the accompanying drawings, it is to be noted that various change and modifications can be made with the scope of the present invention. Incidentally, the contents of Japanese Patent Application No. 2001-306320 are hereby incorporated by reference.

What is claimed is:

1. A recording medium playback apparatus comprising:
    a tray moving freely between a playback position in which the tray is received in a main body for reading out data recorded on a recording medium and a mount position in which the tray is projected out of the main body for mounting or dismounting the recording medium on/from the tray,
    said tray comprising:
        a tray body;
        a playback mechanism, being mounted to move freely against the tray body, for mounting the recording medium thereon and reading out data recorded on the recording medium; and
        a displacement limiter moving freely between a permissible position in which the playback mechanism is permissible to move against the tray body and a limited position in which the playback mechanism is limited to move against the tray body, whereby the displacement limiter is positioned in the permissible position when the tray is set in the playback position and that in the limited position when the tray is set in the mount position.

2. The recording medium playback apparatus according to claim 1, wherein the displacement limiter moves between the permissible position and the limited position by interlocking to the movement of the tray into and out of the main body.

3. The recording medium playback apparatus according to claim 2, further comprising:
    a retainer moving freely between a retaining position in which the tray is retained in the playback position and a release position in which the tray is made to move freely between the playback position and the mount position, wherein the displacement limiter moves from the permissible position to the limited position by interlocking to the movement of the retainer from the retaining position to the release position.

4. The recording medium playback apparatus according to claim 1, wherein the displacement limiter moves the tray toward the mount position when the displacement limiter moves from the permissible position to the limited position.

5. The recording medium playback apparatus according to claim 4, the displacement limiter comprising:
    an arm portion being mounted rotatably on the tray body; and
    an urging device for urging the arm portion in such a direction that one end of the arm portion enters the playback mechanism, whereby the other end of the arm portion pushes the tray by means of urging force of the urging device to move the tray toward the mount position when the arm portion turns from the permissible position to the limited position.

6. The recording medium playback apparatus according to claim 5, further comprising a supporter for supporting a near-portion of the one end of the arm portion when the arm portion is set in the playback mechanism.

7. The recording medium playback apparatus according to claim 5, wherein the one end of the arm portion is tapered gradually in proportion to a distance to the playback mechanism.

8. The recording medium playback apparatus according to claim 5, wherein the playback mechanism has an opening for the one end of the arm portion going therethrough, whereby the opening is formed to have gradually widening in width, in a direction perpendicular to a direction of the arm portion entering the opening, toward an opposite direction of the one end of the arm portion entering the opening.

* * * * *